May 12, 1970  W. H. ST. LAURENT, JR  3,512,021
GAS BEARING MOTOR
Filed Nov. 14, 1966

INVENTOR.
Wilfred H. St. Laurent, Jr.
BY
Thomas N. Young
ATTORNEY

United States Patent Office 3,512,021
Patented May 12, 1970

3,512,021
GAS BEARING MOTOR
Wilfred H. St. Laurent, Jr., Marblehead, Mass., assignor to General Motors Corporation, Detroit, Mich., a corporation of Delaware
Filed Nov. 14, 1966, Ser. No. 593,846
Int. Cl. H02k 5/16, 7/08
U.S. Cl. 310—67                                6 Claims

ABSTRACT OF THE DISCLOSURE

A gas bearing motor including a stator portion having a single central journal section and an annular rotor wheel with an axial bore for receiving the journal. A single thrust plate is mounted on the stator on one side of the journal adjacent the motor wheel and is substantially enclosed by a thrust plate cap plate and spacer mounted to the rotor wheel and thereby provides bidirectional axial stiffness. The stator windings are supported from a portion of the stator on the opposite side of the journal and extend axially into an annular depression formed in the rotor wheel.

---

This invention relates to motors and, more particularly, to a hysteresis motor suitable for application to gyros in which the rotor portion is supported by hydrodynamically generated gas pressure.

Hysteresis motors are commonly used to drive the rotating wheel of gyros used in inertial navigation systems and the like. To minimize friction effect and to maximize motor performance, gas bearings may be employed to support the rotating parts of the motor, e.g., the gyro wheel, relative to the stationary parts of the motor, e.g., the stator windings. Since it is desirable that the bearings be as stiff, that is, to provide as much supporting force, as possible at the operating speed of the motor, the thrust plate which provides axial stiffness should have a fairly large diameter. On the other hand, for the motor to operate efficiently, the length to diameter ratio of the stator windings should be high. If a single centrally-located thrust plate is employed in a particular motor design, small diameter stator windings can generally only be accomplished through the use of two laterally opposite motor windings. Conversely, centrally located motor winding requirements may necessitate the use of two laterally opposite thrust plates to provide sufficient axial stiffness.

In accordance with this invention, a hysteresis motor employing journal thrust plate-type gas bearings is provided. The motor possesses the usually anomalous advantages of large thrust plate diameter capability as well as a high length to diameter stator winding ratio while requiring only a single thrust plate and a single motor winding.

In general, this is accomplished by a motor of asymmetric design in which the stator portion includes a substantially cylindrical journal having an axis of symmetry; a thrust plate, which may be of large diameter, mounted near one end of the journal and winding support means mounted near the other end. Motor windings are mounted on the support means so as to be radially spaced from the journal and so as to extend axially toward the thrust plate. In a particular embodiment, the windings are adapted to operatively associate with a radially outwardly-mounted rotor thereby maximizing the inertia of the rotor wheel and minimizing the diameter of the stator windings. The rotor portion is generally annular and has an axial bore for receiving the journal and an axially symmetric space for accommodating the thrust plate. This space is substantially closed except, of course, for a bore to permit passage of the axially extreme portions of the journal so as to substantially enclose the thrust plate thereby providing bi-directional axial stiffness. The rotor is also provided with an annular depression which is concentric with the journal and which is adapted to receive the stator windings in spaced relation therein so as to propel the rotor portion angularly about the stator portion thereby generating gas pressure in the radial and axial gaps to both radially and axially support the wheel for substantially free rotation.

Through suitable design, the center of gravity of the assembly may be placed in the center of the journal portion, the mass of the stator windings being substantially offset by the mass of the plate and associated apparatus.

In addition, the design employing the stator portion as the internal member enjoys a temperature stability advantage wherein a large thermal expansion mismatch between the stator and rotor portions is permitted. This is due to the fact that boh the axial and radial gaps increase and decrease together both being determined by the dimensional stability of the rotor portion. Furthermore, the motor operates at or substantially near a maximum temperature in which the gaps are a minimum providing the greatest support forces.

Further features and advantages of the invention will be appreciated from the following description of the specific embodiment. This description is to be taken with the accompanying drawings of which:

Figure 1:
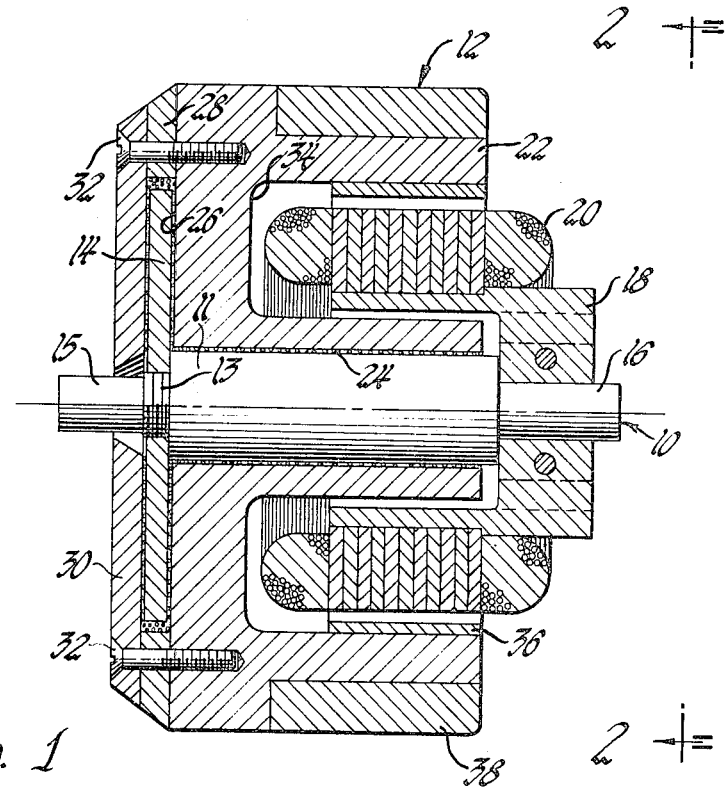
FIG. 1 is a cross sectional view of a specific embodiment of the invention.

Referring to the drawings, the subject motor is shown to comprise a stator portion 10 and a rotor portion generally designated at 12. The stator portion 10 comprises a central journal section 11 having a smooth cylindrical bearing surface and axially opposite extremities 15 and 16 which may be employed to mount the motor assembly within a gyro float. The journal 11 may be constructed of beryllium with an alumina coating. On the left side of the journal 11, as shown in the drawing, a section 13 of reduced diameter is threaded to receive a disc-shaped thrust plate 14. When properly assembled to the journal 11, the plane of the thrust plate is perpendicular to the axis of symmetry of the journal. Journal extremity 16 has mounted thereon a winding support member 18 which carries stator winding 20. The member 18 comprises a radially extending hub portion which is suitable affixed to extremity 16 and an axially extending annular portion on which winding 20 is placed. Stator winding 20 is adapted to be operatively associated with a radially outboard rotor assembly, that is, the rotating field which is generated by the winding 20 extends radially outwardly from the winding.

Figure 2:
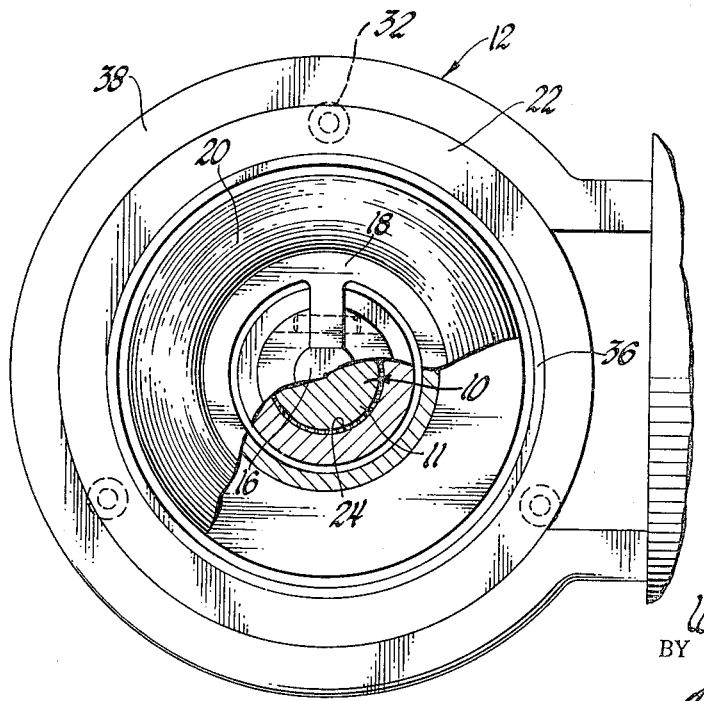
FIG. 2 is an end view, partly sectioned of the FIG. 1 embodiment.

As FIGS. 1 and 2 indicate, the motor design contemplates a substantially internal motor winding and a substantially external rotor configuration. This permits the winding 20 to be of minimum diameter and of maximum axial width thereby to reduce the DC resistance of the winding 20 and to maximize the efficiency of operation thereof. Furthermore, this design permits a maximum moment of inertia in the rotor 12 which is desirable in gyroscopic instruments.

More specifically, the rotor assembly 12 includes a rotor wheel 22 which is substantially E shaped in cross section as shown in FIGURE 1. The rotor wheel 22, which may be constructed of beryllium, has formed therein a central axial bore 24 which accommodates the journal 11 in spaced relation therewith to form a radial air gap. When rotated at the designed speed, the gas: e.g., air or helium, within the gap generates pressure which provides radial stiffness supporting the rotor portion 12 free from physical contact with the stator 10. The left side of the wheel 22, as shown in the drawings, is provided with a smooth bearing surface 26 which forms one of the bearing surfaces reacting with the thrust plate 14. The other axial bearing surfaces are formed by a spacer 28 and a cap plate 30. The annular spacer 28 is mounted on the left hand surface 26 of the wheel 22. As noted in the figure, the internal diameter of the spacer 28 is larger than the external diameter of the thrust plate 14 so as to maintain a spaced relationship between the thrust plate and all parts of the rotating assembly 12. The thrust plate cap plate 30, which is of generally disc-like configuration and having a single center opening for permitting passage of extremity 15, is fitted on top of the spacer 28 and maintained in position by means of screws 32. The assembly 26, 28, 30, 32 thus provides a substantially closed space which is symmetric about the journal axis within which the thrust plate 14 resides. Since a bearing surface is adjacent, but spaced from, the axially opposite sides of the thrust plate 14, bi-directional axial stiffness is achieved.

To accommodate the motor winding 20 in an internal relationship therewith, the wheel 22 has formed therein an annular depression 34 which is relatively deep considering the overall axial width of the wheel 22. The depression is radially spaced intermediate the central bore and the radially outermost portion of the rotor assembly 12. The depression 34 thus accommodates the stator winding 20 and the windings support member 18. A hysteresis ring 36 is mounted on the radially outermost surface of the depression 34 and is radially spaced from the motor windings 20 to react to the rotating magnetic field to produce a torque on the rotor assembly 12 which rotates the assembly in synchronism with the rotating field in the typical hysteresis motor fashion. In addition, the moment of inertia of the rotor assembly 12 is maximized through the addition of a heavy inertia rim 38. As shown in FIG. 1, the rim 38 is integrated with the wheel 22 and spaced as radially outwardly as possible to maximize the moment of inertia.

In operation, the motor winding 20 is energized to produce a rotating field which, as previously described rotates the rotor assembly 12 about the axis of symmetry of the motor. Upon reaching a predetermined speed, the gas pressure which is generated in the journal gap between journal 11 and the bore 24 elevates the rotor assembly 12 free from physical contact with the journal 11. In a similar fashion, the gas pressure which is generated in the gaps between the thrust plate 14 and the axially adjacent bearing surfaces produces axial stiffness which tends to maintain the assembly in the position shown. This axial stiffness resists any axial displacement between rotor and stator which might arise due to axial accelerations of the unit. As previously described, the motor may be designed such that the center gravity is located at the geometrical center of the assembly.

While the invention has been described with reference to a specific embodiment, it is to be understood that various modifications and additions to the assembly may be made without departing from the spirit and scope of the invention. For a definition of the invention, reference should be had to the appended claims.

What is claimed is:

1. A motor comprising a stator portion and a rotor portion,
   a thrust plate and winding support means mounted on the stator portion,
   the stator portion including a substantially cylindrical journal intermediate the thrust plate and the winding support means, said winding support means extending radially therefrom, winding means mounted on the support means and extending axially toward the thrust plate and adapted for operative association with a radially outward rotor,
   the rotor portion being generally annular in shape and having an axial bore for receiving the journal in radially spaced relation therewith, an axially symmetric radially-extending, substantially closed space formed in the rotor portion for receiving the thrust plate in spaced relation therewith, and an annular depression formed in the rotor portion radially outwardly of the axial bore symmetrically about the journal axis and extending axially from the side opposite the thrust plate toward the thrust plate for receiving the stator winding means in spaced relation therewith.

2. The apparatus defined in claim 1 further including a hysteresis ring mounted on the radially outward surface of the annular depression of the rotor wheel and adapted for operative association with the winding means.

3. The apparatus defined in claim 2 further including a heavy inertia rim attached to the radially outer surface of the rotor portion.

4. The apparatus defined in claim 1 wherein the stator winding means has a high axial length to diameter ratio.

5. The apparatus defined in claim 1 wherein the rotor portion includes an annular wheel having a depression as described, a thrust plate cap plate fixed to the thrust plate side of the wheel coaxially with the journal bore, and an annular spacer disposed intermediate the wheel and the cap plate coaxial with said bore and having an inner diameter larger than the diameter of the thrust plate thereby forming the closed space for receiving the thrust plate.

6. A motor comprising a stator portion including a central substantially cylindrical journal section and first and second support sections extending in axially opposite directions from said central journal section, a thrust plate of predetermined external diameter mounted on said first support section, a rotor assembly including a rotor wheel having a central axial bore for receiving said journal section in spaced relation therewith, one side of said wheel being provided with a bearing surface extending radially from said bore and cooperating with substantially the entire surface on one side of said thrust plate, a thrust plate cap plate having an opening receiving said first support section and including a radially extending bearing surface cooperating with substantially the entire surface on the other side of said thrust plate, an annular spacer of larger internal diameter than the external diameter of said thrust plate interposed between said thrust plate cap plate and said one side of said rotor wheel, said spacer having a width greater than the width of said thrust plate to provide an axially gap between each side of said thrust plate and respective ones of said radially extending bearing surfaces, means securing said spacer and said thrust plate cap plate to said one side of said wheel, said rotor wheel having an annular depression radially spaced from said bore and extending axially inwardly from the opposite side of said wheel toward said one side of said rotor wheel, winding support means mounted on said second support section and extending radially therefrom, winding means mounted on said support means and extending axially into said depression, a hysteresis ring mounted on the radially outward surface of said annular depression of said rotor wheel and adapted for operative association with said winding means and an inertia rim attached to the radially outer surface of said rotor wheel.

References Cited

UNITED STATES PATENTS 3,027,471   3/1962   Burgwin et al. _____ 310—67

J D MILLER, Primary Examiner

G. P. TOLIN, Assistant Examiner

U.S. Cl. X.R.

310—74, 90, 266

PO-1050
(5/69)

UNITED STATES PATENT OFFICE
CERTIFICATE OF CORRECTION

Patent No. 3,512,021    Dated  May 12, 1970

Inventor(s)    Wilfred H. St. Laurent, Jr.

It is certified that error appears in the above-identified patent and that said Letters Patent are hereby corrected as shown below:

In the Specification, Column 1, line 45, insert -- if a -- after "Conversely".
Column 2, line 19, "boh" should read -- both --.

SIGNED AND SEALED
NOV 24 1970

(SEAL)
Attest:

Edward M. Fletcher, Jr.
Attesting Officer

WILLIAM E. SCHUYLER, JR.
Commissioner of Patents